United States Patent [19]
Hollaway

[11] Patent Number: 5,892,331
[45] Date of Patent: Apr. 6, 1999

[54] LAMP CONTROL RESPONSIVE TO RAPID INCREASES IN AMBIENT LIGHT

[76] Inventor: Jerrell P. Hollaway, 1330 Meadowbrook Rd., NE, Palm Bay, Fla. 32905

[21] Appl. No.: 610,358

[22] Filed: Mar. 4, 1996

[51] Int. Cl.⁶ .................................................. H05B 37/00
[52] U.S. Cl. ........................ 315/159; 315/151; 315/360; 340/568
[58] Field of Search ........................ 315/159, 151, 315/156, 360, 158; 250/214 AL, 214 SG, 214 B, 214 C, 221, 222.1; 340/565, 555, 556, 557, 568

[56] References Cited

U.S. PATENT DOCUMENTS

| | | | |
|---|---|---|---|
| 3,630,015 | 12/1971 | Lehovec | 368/82 |
| 3,909,819 | 9/1975 | Radford | 340/545 |
| 4,441,143 | 4/1984 | Richardson | 362/183 |
| 4,587,417 | 5/1986 | Duve et al. | 250/214 AL |
| 4,587,459 | 5/1986 | Blake | 315/158 |
| 4,697,122 | 9/1987 | Hoffer | 315/158 |

*Primary Examiner*—Don Wong
*Assistant Examiner*—David H. Vu

[57] ABSTRACT

A lamp control apparatus that responds to sudden increases in ambient light by energizing a light bulb for a short period of time. A first voltage comparator is connected to a photocell circuit such that its output normally presents a high impedance to a timing capacitor connected to the input of a second voltage comparator which, in turn, provides a gate signal for a triac power switch. The first comparator will switch to a low impedance output if a sufficient amount of light suddenly appears at the photocell. This low impedance will rapidly discharge the timing capacitor and allow the second comparator to energize the lamp. The timing capacitor will then slowly charge back to a voltage that will cause the second comparator to remove the gate signal for the triac, thereby de-energizing the lamp.

5 Claims, 1 Drawing Sheet

LAMP CONTROL RESPONSIVE TO RAPID INCREASES IN AMBIENT LIGHT

BACKGROUND OF THE INVENTION

This invention relates to photoelectric controls used to energize lamps in changing ambient light conditions.

There have been many controls designed to energize lamps when ambient light levels drop below a predetermined point. Many lamp controls operate in a dusk-to-dawn mode of operation, for example. The reason most controls operate in this manner is obvious; more light is often needed or desired only when the ambient light has decreased to the point that it is unsuitable for the purpose at hand.

In perhaps no case does a light control energize a lamp as ambient light levels increase. This mode of operation could be useful, however, in certain situations. For example, it would be useful for a lamp to be energized when the door to a closet is opened, exposing the interior of the closet to an increased, but still insufficient, amount of light. It is understood that certain products may fulfill this need by detecting motion. These products are, unfortunately, relatively expensive.

An object of the present invention is to provide a photoelectric control that energizes a lamp when ambient light levels increase. Another object is for the control to respond only to a rapid change from a previous level of ambient light. Another object is to de-energize the lamp after it has been energized for a period of time. Still another object is to energize the lamp each time power is removed and reapplied, regardless of the ambient light level. A final objective is to provide a simple design for the control which will result in a small and inexpensive product which can readily be used in homes and businesses.

SUMMARY OF THE INVENTION

Disclosed herein is a photoelectric lamp control that uses a photocell in a light sensing circuit, a differential voltage comparator circuit, a timer circuit, and a power switch which is connected between a source of External power and a lamp. When the light sensing circuit detects an increase in light level, a corresponding decrease in voltage is presented to the differential voltage comparator. If this decrease in voltage is rapid enough, the comparator will output a reset signal to the timer circuit. The timer circuit (which also uses a voltage comparator) will then output a gate signal to a triac power switch. The triac will now cause the lamp to be energized until the timer circuit stops providing the gate signal.

DESCRIPTION OF THE PREFERRED EMBODIMENT

Figure 1:
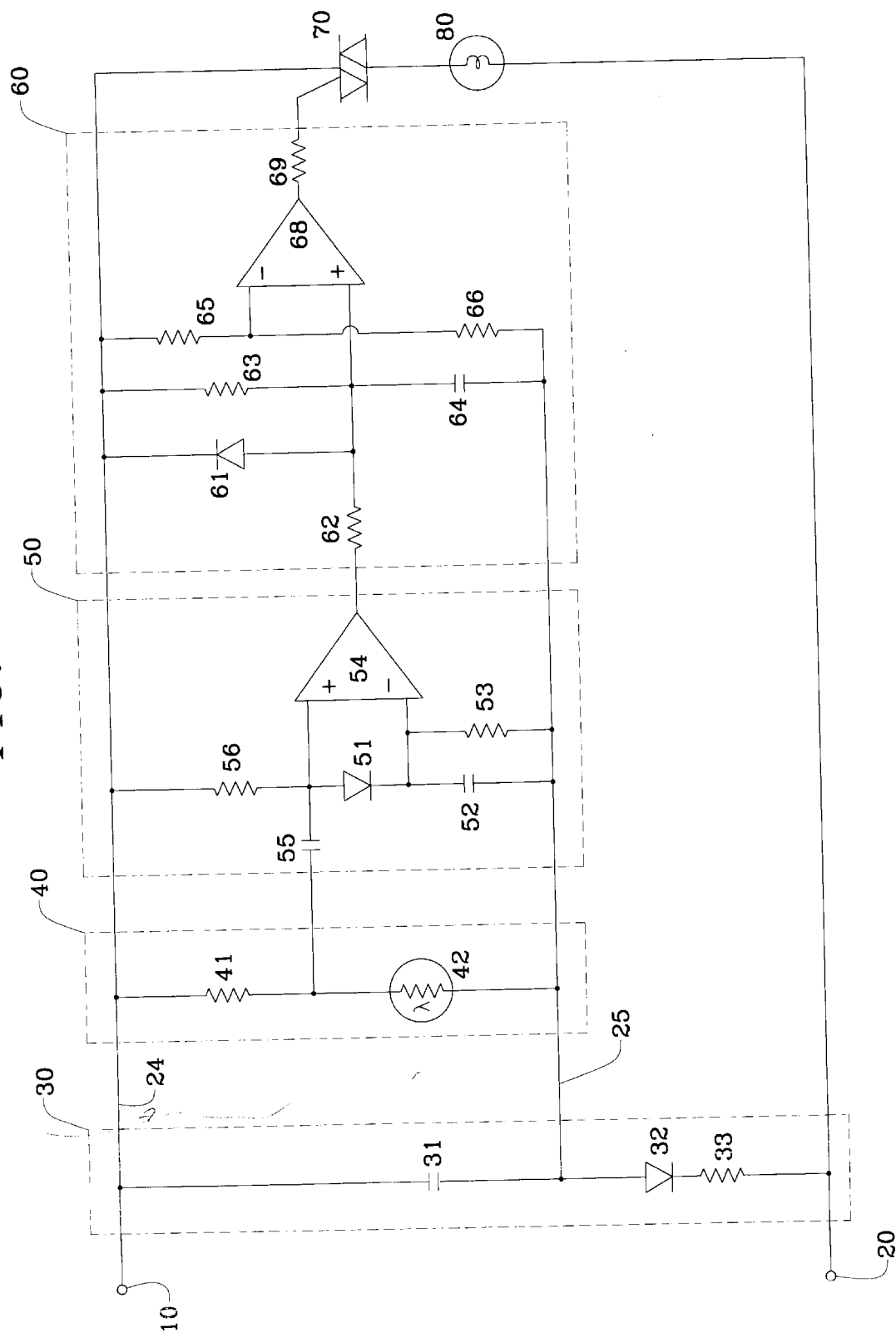
FIG. 1 is a schematic diagram of a preferred embodiment of the present invention.

Referring to FIG. 1, light sensing circuit 40 consists of photocell 42 and resistor 41 connected as a voltage divider. The output of this voltage divider is connected through capacitor 55 to the non-inverting input of voltage comparator 54 in differential comparator circuit 50. Diode 51 is connected between the inputs of 54, with the cathode of 51 being connected to the inverting input of 54. Resistor 56 is connected between the non-inverting input of 54 and line 24 of DC power supply 30. Capacitor 52 and resistor 53 are connected between the inverting input of 54 and negative line 25 of DC power supply 30.

The output of 54 is coupled to the non-inverting input of comparator 68 in timer circuit 60. Resistor 63 and diode 61 also connect to the non-inverting input of 68 and Line 24 of DC power supply 30, with the cathode of 61 connected to 24. Capacitor 64 connects between the junction of 61, 62 and 63 and line 25. Resistor 65 is connected between 24 and the inverting input of 68. Resistor 66 also connects between the inverting input of 68 and Line 25. The output of 68 is connected through resistor 69 to the gate of power switch 70. One main terminal of 70 connects to line 24 and the other main terminal of 70 connects to load 80, a lamp. The other side of the load is connected directly to AC power line 20. Resistor 33 of DC power supply 30 is connected between line 20 and the cathode of diode 32. The anode of 32 is connected to line 25. Capacitor 31 is connected between AC power line 10 and line 25. For simplicity purposes, the normal connections between 30 and comparators 54 and 68 are not shown.

In operation, DC power supply 30 converts the AC voltage across lines 10 and 20 to a lower DC voltage across lines 24 and 25 in a manner that is well known. Light sensor 40 provides an output signal, which is normally a slowly changing voltage, to one side of capacitor 55 as ambient light levels slowly change during the day and night. Since diode 51 is connected across the inputs of comparator 54, the voltage on the inverting input of 54 will be less than the voltage on the non-inverting input by approximately 0.6 volt, or one diode drop. If, however, a rapid increase in light strikes photocell 42 due to, perhaps, the opening of a door to a closet, the voltage on both sides of capacitor 55 will be suddenly lower, and the voltage applied to the non-inverting input to 54 through Capacitor 55 may drop below the voltage stored in capacitor 52. When this occurs, the output of 54 will change from high impedance to low impedance, and will stay in this condition until resistor 53 discharges 52 enough for 54 to return to a high impedance state. Circuit 50 thusly performs as a differential comparator.

The amount of light increase between two points in time required to cause the action just described is determined, in this embodiment, by the properties of 41, 42, 51, 52, 53, 54, 55 and 56. A rate of change discrimination, which is also required, is performed by the lime constant of capacitor 55 and resistor 56. In other possible comparator means, such as a microprocessor, the amount of light at two points in time could be measured by an analog-to-digital converter and the rate of change could then be calculated by the internal programming.

Timer circuit 60 operates in the following manner:

Each time that 54 has a low impedance output, timing capacitor 64 is rapidly discharged through resistor 62, thereby causing timer 60 to be reset. When this occurs, the voltage provided to the inverting input of 68 by the voltage divider of 65 and 66 will be higher than the voltage on the non-inverting input of 68 and the output of 68 will change from high impedance to low impedance, providing gate current through 69 to triac 70. Triac 70 will then energize lamp 80 for as long as it takes for 63, a high value resistor, to slowly charge capacitor 64. When 64 is sufficiently charged, the timer period will be completed, the output of 68 will return to high impedance and lamp 80 will be de-energized.

It is also desirable that lamp 80 be energized each time AC power is applied. This is accomplished by diode 61 providing a rapid discharge path for 64 anytime AC power is removed and DC power supply 30 has no output. With no charge in 64 at the time of power application between lines 10 and 20, the voltage divider of 65 and 66 will present a higher voltage to the inverting input than capacitor 64 can provide to the non-inverting input and the output of 68 will, therefore, be low impedance, rather than high impedance, and lamp 80 will be energized.

Other methods of providing the functions of this invention may surely be accomplished by those skilled in the art of circuit design without departing from the essence and spirit of the present invention. Both differential comparator 50 and timer circuit 60, for example, could be functions of a microprocessor.

I claim:

1. A lamp control apparatus comprising in combination:

light sensor means which produces output signals representative of the amount of light present at said sensor means at various points in time;

circuit means which includes rate of change discrimination means coupled to said sensor means to provide control signals only when said output signals from said sensor means change at a rate greater than a prescribed rate; and power switch means coupled between an external power source and a load and responsive to said control signals from said circuit means such that only a rapid increase in said light at said sensor will cause said load to be energized.

2. An apparatus according to claim 1, which also includes a timer means which de-energizes said load a prescribed amount of time after said load was energized.

3. An apparatus according to claim 2, wherein said circuit means resets said timer means and provides said control signals to said power switch means whenever said power source is connected to said apparatus following a prescribed period of time during which said source of power was disconnected from said apparatus, regardless of said output signals from said sensor means.

4. The apparatus of claim 1, wherein said circuit means includes a comparator means.

5. A method of energizing an electrical load as a result of a rapid increases in light consisting of:

sensing light levels at a first point in time and a second point in time;

comparing said levels at the second point in time;

reacting to time between said two points such that said load is energized only when said level at said second point is greater than a prescribed level and said time between said two points is less than a prescribed amount of time.

* * * * *